United States Patent
Kahlert et al.

(10) Patent No.: US 7,840,227 B2
(45) Date of Patent: Nov. 23, 2010

(54) LOCATION BASED HANDOFF FOR MOBILE DEVICES

(75) Inventors: Joachim J. Kahlert, Aachen (DE); Markus Baumeister, Aachen (DE); Olaf Wischhusen, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 551 days.

(21) Appl. No.: 10/599,413

(22) PCT Filed: Mar. 30, 2005

(86) PCT No.: PCT/IB2005/051066
§ 371 (c)(1), (2), (4) Date: Sep. 28, 2006

(87) PCT Pub. No.: WO2005/099173
PCT Pub. Date: Oct. 20, 2005

(65) Prior Publication Data
US 2008/0242305 A1 Oct. 2, 2008

Related U.S. Application Data

(60) Provisional application No. 60/559,756, filed on Apr. 6, 2004, provisional application No. 60/578,337, filed on Jun. 9, 2004.

(51) Int. Cl.
*H04W 24/00* (2009.01)
(52) U.S. Cl. ............ 455/456.2; 455/456.1; 455/525; 455/440; 370/331
(58) Field of Classification Search ............ 370/401, 370/403, 338, 389; 455/436, 456, 403, 456.1–457, 455/440, 441, 452.2, 453.1, 525, 550.1, 552.1, 455/553.1
See application file for complete search history.

(56) References Cited
U.S. PATENT DOCUMENTS
6,052,598 A 4/2000 Rudrapatna et al.
(Continued)

FOREIGN PATENT DOCUMENTS
EP 1 081 974 A2 3/2001
(Continued)

OTHER PUBLICATIONS
Proxim, Inc.; What is a Wireless LAN?; Mar., 1998; AD Brochure of Proxim, Inc.
(Continued)

*Primary Examiner*—Kamran Afshar
*Assistant Examiner*—Chuong A Ngo

(57) ABSTRACT

Mobile devices ($12_1, 12_2, \ldots, 12_n$) are handed off in overlapping cells ($18_1, 18_2, \ldots, 18_n$) by tracking a velocity (speed and direction) of movement of any number of the mobile devices ($12_1, 12_2, \ldots, 12_n$). Access points ($14_1, 14_2, \ldots, 14_n$) are each located in an associated operational cell ($18_1, 18_2, \ldots, 18_n$) and each operates at a dedicated frequency. The initial signal strengths are measured in advance at predefined locations within a defined space (16) to define signal strengths as location map (42). A nearby initial access point (typically the nearest) and at least two nearby (typically next nearest) access points are assigned for one of the mobile devices ($12_1, 12_2, \ldots, 12_n$), and the frequencies of each access point identified. A tracking processor (50) periodically scans the frequencies of the nearby access points to determine the location velocity of the mobile device and predict when a handoff will be appropriate. E.g., the actual signal strength measurements between the mobile device and the nearby access points are collected and analyzed to determine a proper time for a handoff of one or more of the nearby access points.

16 Claims, 2 Drawing Sheets

U.S. PATENT DOCUMENTS

Figure 1:
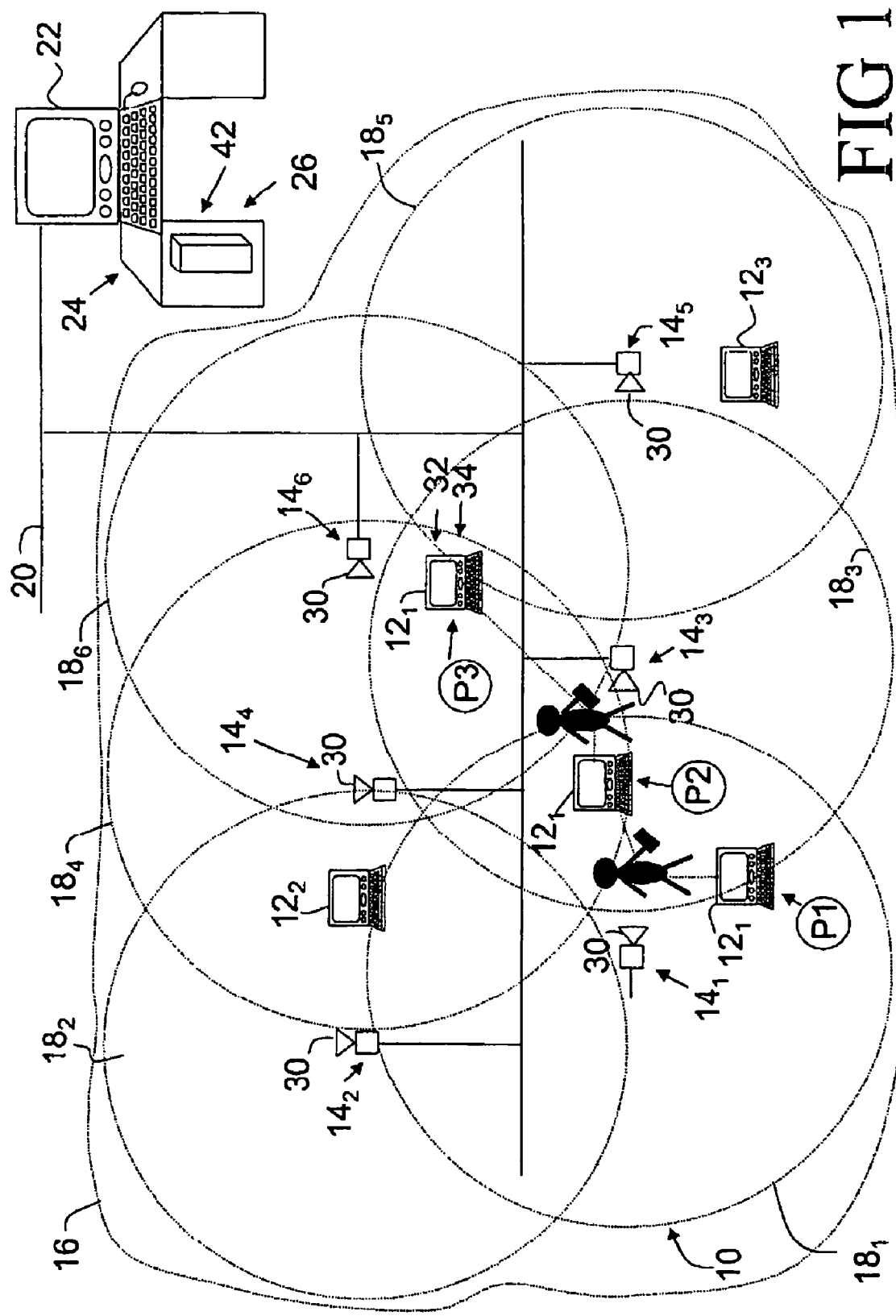

| | | | |
|---|---|---|---|
| 6,243,583 B1 | 6/2001 | Tsutsui et al. | |
| 6,359,587 B1 * | 3/2002 | Sugiura et al. | 342/457 |
| 6,484,032 B1 * | 11/2002 | Okada | 455/456.1 |
| 6,674,403 B2 | 1/2004 | Gray et al. | |
| 2002/0082012 A1 * | 6/2002 | Wang et al. | 455/435 |
| 2003/0013454 A1 * | 1/2003 | Hunzinger | 455/452 |
| 2003/0036374 A1 * | 2/2003 | English et al. | 455/403 |
| 2003/0050064 A1 * | 3/2003 | Davies et al. | 455/441 |
| 2003/0060201 A1 | 3/2003 | Soliman | |
| 2003/0118015 A1 * | 6/2003 | Gunnarsson et al. | 370/389 |
| 2004/0023649 A1 * | 2/2004 | Bing et al. | 455/422.1 |
| 2004/0039817 A1 * | 2/2004 | Lee et al. | 709/225 |
| 2004/0152480 A1 * | 8/2004 | Willars et al. | 455/513 |
| 2004/0263388 A1 * | 12/2004 | Krumm et al. | 342/451 |
| 2005/0130668 A1 * | 6/2005 | Cameron | 455/456.1 |

FOREIGN PATENT DOCUMENTS

| | | |
|---|---|---|
| EP | 1 349 413 A1 | 10/2003 |
| WO | WO 00 28768 A1 | 5/2000 |
| WO | WO 03 107704 A1 | 12/2003 |

OTHER PUBLICATIONS

MSI E-Service; MSI WLAN PC2PC;Mar. 2004; http://www,msi-polska.pl/html/e_service/techexpress/tech_columns/wlan/page1.htm.

Walana; Introduction to Wireless LANs; 1996; www.wlana.org/learn/intro.pdf.

Pack, S., et al.; Pre-Authenticated Fast Handoff in a Public Wireless LAN Based on IEEE 802.1x Model; 2002; mmlab8.snu.ac.kr/research/publication/docs/pwc2002-shpack.pdf.

* cited by examiner

LOCATION BASED HANDOFF FOR MOBILE DEVICES

CROSS REFERENCE TO RELATED APPLICATIONS

This application claims the benefit of U.S. Provisional Application Ser. No. 60/559,756 filed Apr. 6, 2004 and U.S. Provisional Application Ser. No. 60/578,337 filed Jun. 9, 2004, which are both incorporated herein by reference.

The present invention relates to the communications arts. It finds particular application in the wireless local area network systems (WLAN) and will be described with particular reference thereto. However, the invention may also find application in other communications systems.

WLAN is a flexible data communications system implemented as an extension to, or as an alternative for, a wired local area network (LAN). Typically, WLAN uses radio frequency (RF) technology to transmit and receive data over the air without relying on any physical connection. The data being transmitted is superimposed on the radio carrier so that it can be accurately extracted at the receiving end. Multiple radio carriers exist in the same space at the same time without interfering with each other, provided that the radio waves are transmitted on different radio frequencies. To extract data, a radio receiver tunes in one frequency while rejecting all other frequencies.

In a typical WLAN system, a transmitter/receiver device, called an access point, connects to the wired network from a fixed location using standard cabling. Typically, the access point receives, buffers, and transmits data between the WLAN and the wired network infrastructure. Generally, a single access point supports a small group of users and can function in a range of approximately thirty to fifty meter radius. End users access the WLAN through WLAN adapters, which are implemented as PC cards in notebook or palmtop computer, as cards in desktop computers, or integrated within hand-held computers. WLAN adapters provide an interface between the client network operating system (NOS) and the airways via antenna.

Generally, in a large facility such as an office, a hospital, a manufacturing facility, or the like, it is necessary to install more than one access point. The access points are installed to blanket the area with overlapping coverage cells so that the clients can roam seamlessly throughout the area without ever loosing contact. When a client moves from one area to another, a handoff has to be performed to assign new system resources associated with the new access point. The handoff involves executing a set of negotiations between the mobile device and a central computer. As a result, the client is handed over from one access point to another in a way that is invisible to the client. Generally, a handoff improves performance of the system at the expense of tying up more system resource.

Efficient and timely handoff procedures are very important within the WLAN which has small operating cells and great demand for increased communications system capacity. A typical approach for a mobile device handoff is to scan all radio frequencies within the WLAN operational space to determine a relative strength of the mobile device signal. However, with many users being hooked up to the WLAN and numerous crossings of cells boundaries, this approach considerably ties up system resources and slows down communications throughput.

There is a need for technique that provides adaptive, fast, efficient, seamless, and cost effective handoff of mobile units in WLAN. The present invention contemplates a new and improved method and apparatus that overcomes the above-reverenced problems and others.

In accordance with one aspect of the present invention, a communications system is disclosed. A plurality of mobile wireless units and a plurality of access points, each surrounded by an associated operational cell, are located within a defined area of a WLAN. The operational cells are overlappingly disposed in the defined space. Each access point operates at a dedicated frequency. A means tracks a movement of at least one mobile device within the defined space. A means scans identified scanning frequencies of nearby access points to measure actual signal strengths between the at least one mobile device and each of the nearby access points. A means calculates at least a position of the at least one mobile device by comparing the actual signal strengths with a map of relative signal strengths at predefined locations in the defined space. A means assigns an access point with a strongest signal to the at least one mobile device based on its location and the map of relative strengths in the defined space.

In accordance with another aspect of the present invention, a method for handing off at least one mobile device from one access point to another in a wireless local area network is disclosed. A movement of the at least one mobile device within the defined space is tracked. Identified scanning frequencies corresponding to each of an identified plurality of nearby access points are scanned. Actual signal strengths at each of the identified frequencies between the at least one mobile device and the identified access points are measured. At least a position of the at least one mobile device is calculated by comparing the actual signal strengths with a map of relative signal strengths at predefined locations in the defined space. An access point with a strongest signal is assigned to the at least one mobile device based on the calculated position and the map.

One advantage of the present invention resides in the fast and efficient handoff of the wireless mobile units in the wireless local area network.

Another advantage resides in the cost effective handoff.

Still further advantages and benefits of the present invention will become apparent to those of ordinary skill in the art upon reading and understanding the following detailed description of the preferred embodiments.

The invention may take form in various components and arrangements of components, and in various steps and arrangements of steps. The drawings are only for purposes of illustrating the preferred embodiments and are not to be construed as limiting the invention.

FIG. 1 schematically shows a portion of a WLAN communications system; and

FIG. 2 schematically shows a part of a WLAN communications system in accordance with the present application.

With reference to FIG. 1, a wireless local area network 10 includes one or more mobile devices or units $\mathbf{12}_1$, $\mathbf{12}_2$, . . . , $\mathbf{12}_n$. Preferably, the mobile devices $\mathbf{12}_1$, $\mathbf{12}_2$, . . . , $\mathbf{12}_n$ are palm computers, notebook computers, held-hand devices, PDAs, pagers, desktop computers, or any other devices which can be configured for wireless communications. Generally, the network 10 couples multiple access points or stations $\mathbf{14}_1$, $\mathbf{14}_2$, . . . , $\mathbf{14}_n$ (only six access points are shown for simplicity of illustration), which are distributed throughout a defined area or space 16 to provide wireless service to the mobile devices $\mathbf{12}_1$, $\mathbf{12}_2$, . . . , $\mathbf{12}_n$ which operate within the space 16 and are configured to communicate with the access points $\mathbf{14}_1$, $\mathbf{14}_2$, . . . , $\mathbf{14}_n$. Each access point $\mathbf{14}_1$, $\mathbf{14}_2$, . . . , $\mathbf{14}_n$ has a finite operational range or access point cell $\mathbf{18}_1$, $\mathbf{18}_2$, . . . , $\mathbf{18}_n$, which is typically 30-50 meters. Each access point $\mathbf{14}_1$, $\mathbf{14}_2$, . . . , $\mathbf{14}_n$ operates within its own dedicated radio channel with a known radiofrequency. Because the operational ranges $18_1, 18_2, \ldots, 18_n$ overlap within the area 16, each channel operates at a unique radiofrequency to prevent concurrent communications of the mobile device $12_1, 12_2, \ldots, 12_n$ with more than one access point at the same frequency. Of course, it is also contemplated that other WLAN designs can be used, in which the frequencies can be reused.

The access points $14_1, 14_2, \ldots, 14_n$ are wired or otherwise connected into a wired network infrastructure or a local area network 20. A central computer 22, which is connected to the local area network 20 and includes associated software means 24 and hardware means or processor 26, oversees the operations of the WLAN system 10 and, preferably, provides an interface to various systems and/or applications which are available within the local area network 20.

Each access point $14_1, 14_2, \ldots, 14_n$ includes an antenna or receiving/transmitting means 30 to communicate bi-directionally with the mobile devices $12_1, 12_2, \ldots, 12_n$. E.g., the access points $14_1, 14_2, \ldots, 14_n$ at least receive, buffer, and transmit data between the mobile devices $12_1, 12_2, \ldots, 12_n$ and the wired network 20. Each mobile device $12_1, 12_2, \ldots, 12_n$ includes associated hardware means 32 and software means 34. The hardware and software means 32, 34 are implemented or integrated into the mobile devices $12_1, 12_2, \ldots, 12_n$ to provide an interface between the mobile devices $12_1, 12_2, \ldots, 12_n$ and the receiving/transmitting means 30.

With continuing reference to FIG. 1, when the mobile device $12_1$ is in the cell $18_1$, it communicates with the access point $14_1$. As the mobile device $12_1$ moves within the defined area 16, the processor 26 executes a set of instructions and, if the handoff is determined to be necessary, handoffs the mobile unit $12_1$ to another access point as will be discussed in a greater detail below.

Figure 2:
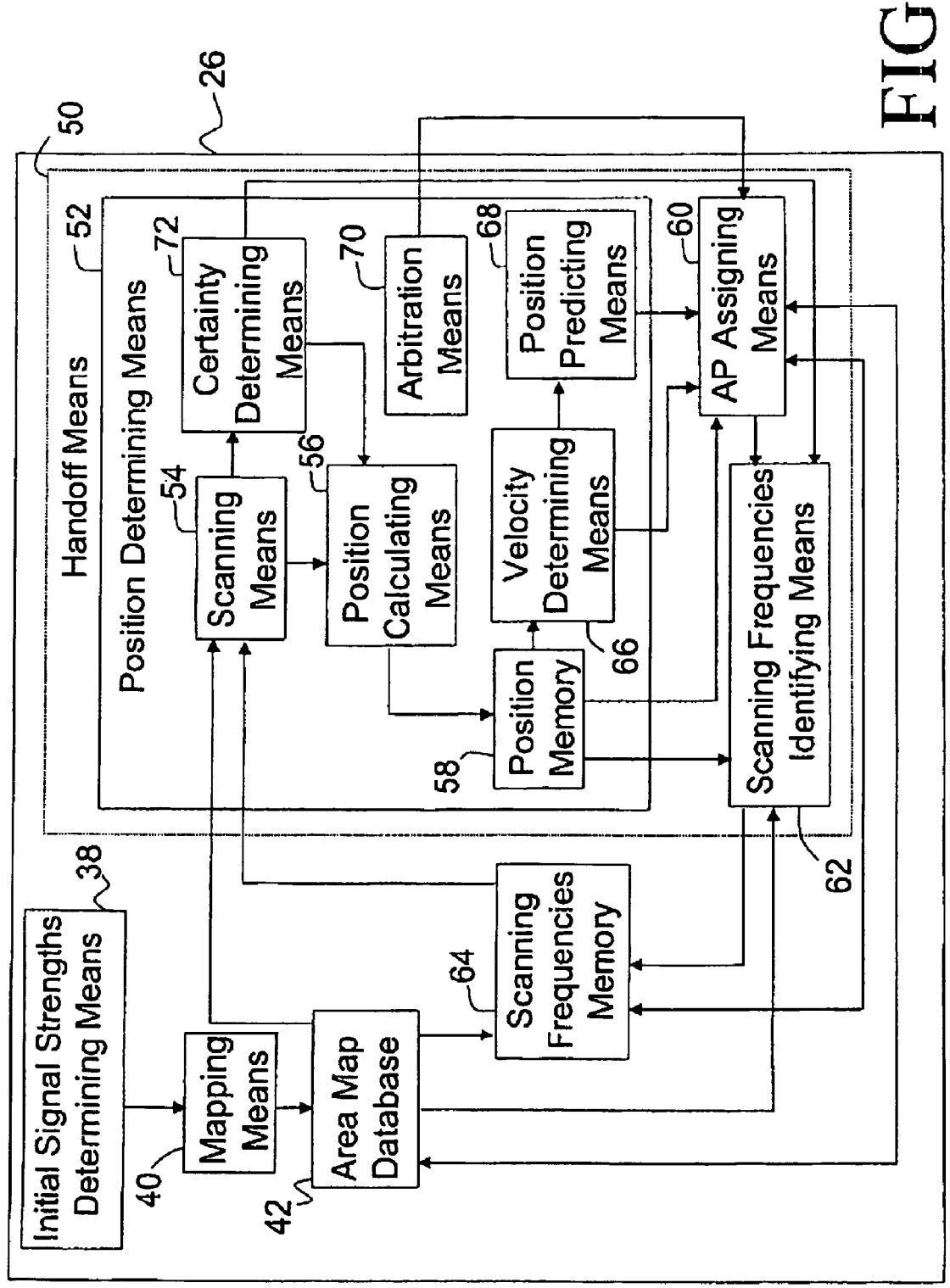

With reference to FIG. 2, an initial signal strengths determining means or computer routine or algorithm 38 determines initial signal strengths, i.e. signal gradients, at predefined locations. Optionally, the initial signal strengths determining means 38 defines the initial signal strengths at the predefined locations statistically. A mapping means 40 maps the initial signal strengths into the defined space 16. A two- or three-dimensional geographical signal strength map of the area 16 indicating all of the stations or access points $14_1, 14_2, \ldots, 14_n$, associated operational frequencies, and the defined initial signal strengths are stored in a database or an area map memory 42. Preferably, the database 42 is located at the central computer 22. Optionally, the database 42 is located within the WLAN 10, e.g. at the mobile device $12_1, 12_2, \ldots, 12_n$.

A handoff means or computer routine or algorithm 48 executes an access point assignment and subsequent handoff to the closest access points for determined locations and identifies a channel with the strongest signal, e.g. the best signal to noise ratio, of the mobile devices $12_1, 12_2, \ldots, 12_n$ within the defined space 16. More specifically, when one of the mobile units $12_1, 12_2, \ldots, 12_n$, such as the mobile unit $12_1$, is powered up, a position determining means or computer routine or algorithm 50 determines the location of the mobile device $12_1$ within the defined space 16. A scanning means or computer routine or algorithm 52 scans operational frequencies of the channels of all the access points within the defined space 16 to determine gradients of actual signal strengths between the mobile device $12_1$ and each of the scanned frequencies. The scanned frequencies are presented in an order of the gradients, e.g. from the highest gradient to lowest, and are stored in a scanned frequencies memory 54. A position calculating means or computer routine or algorithm 56 calculates a position of the mobile device $12_1$, e.g. the initial position P1, by comparing the actual signal strengths against the mapped signal strengths. Preferably, the position is determined from the relative signal strengths of the three strongest frequencies, normally the three closest stations. However, other numbers of frequencies/stations for determining the position of the mobile units can be used. A larger number gives greater positional accuracy. In some instances, less than three may identify the location of the mobile unit uniquely, particularly when walls and other physical obstructions are considered.

The determined position P1 is stored in a position memory 58. An access point assigning means or computer routine or algorithm 60 identifies a location of an access point with the strongest signal and assigns it to the mobile device $12_1$. A scanning frequencies identifying means or computer routine or algorithm 62 identifies frequencies of, preferably three adjacent channels, e.g. three access points $14_1, 14_3, 14_4$ which are closest to the position P1 which typically have the strongest signals. The three adjacent access points and corresponding frequencies of each associated channel are stored in a scanning frequencies memory 64.

As the mobile device $12_1$ moves from the position P1 towards position P2, the signal strength between the mobile device $12_1$ and the access point $14_1$ is declining and signal strength between the mobile device $12_1$ and the access points $14_3$ and $14_4$ is increasing. With the defined space 16 being mapped, the scanning means 52 periodically scans the three stored adjacent frequencies to collect the signal strength values between the mobile device $12_1$ and the frequencies of the three closest access points as the mobile device $12_1$ moves from the position P1 toward the position P2. The position calculating means 56 calculates a new position of the mobile device $12_1$. Preferably, the exact position of the mobile device $12_1$ is triangulated by comparing the actual signal strengths at the three measured frequencies. A velocity determining means or computer routine or algorithm 66 compares location results of the periodic scanning and determines speed and direction of movement of the mobile device $12_1$ or any other mobile device within the defined space 16. Based on the speed and direction of the mobile device, a future position predicting means or computer routine or algorithm 68 predicts future positions of the mobile device as well as projected future signal strengths between the mobile device and access points of the cell in which the mobile device is located and adjacent cells.

If it is determined that the mobile device $12_1$ is approaching a new position, e.g. the position P2, at which the map 42 shows a different access point will have stronger signal, the access point assigning means 60 assigns the mobile device $12_1$ a new primary communication access point which, preferably, has the strongest signal. By consulting the map 42, the scanning frequencies identifying means 62 identifies the frequencies of the, preferably, three access points $14_1, 14_4, 14_6$ that provide the strongest signals with the new position P2. In this example, the three access points which measure location stay the same, but the access point through which communication occurs shifts from $14_1$ to $14_3$.

As the mobile device moves toward location P3, one of the three location measurement access points changes, i.e., the three closest change from $14_1, 14_3,$ and $14_4$ to $14_3, 14_4,$ and $14_6$. The change over from access point $14_1$ to $14_6$ is preferably done at the time which the position predicting means predicts the mobile device will become closer to access point $14_6$ than to access point $14_1$. In this manner, if the mobile device is moving so fast compared to the location sampling interval that it will be out of range of access point $14_1$, it will still seamlessly triangulate its position off of access points $14_3, 14_4,$ and $14_6$. The three new adjacent access points and corresponding frequencies of each associated channel are stored in the scanning frequencies memory 64 to be periodically analyzed by the position determining means 50 to monitor the position of the mobile device $12_1$. The AP assigning means 60 accesses the map 42 and the scanning frequencies memory 64 to retrieve the frequencies of the new access point $14_6$ and the discontinued access point $14_1$. This frequency change is communicated to the mobile device to cause a seamless change in the scanning frequencies without searching all frequencies looking for the new closest access points.

With continued movement to P3, the communication frequency is changed from the frequency of access point $14_3$ to the frequency of access point $14_6$.

In some circumstances, the access point assigning means 62 may not assign a mobile unit to the access point with the strongest signal. The access point assigning means 60 confers with an arbitration means or computer algorithm 70 to determine the best overall distribution of the assignment of the mobile devices to the access point. In one example, the arbitration means 70 looks to see if any access point is overcrowded or approaching capacity. If a mobile unit is approaching a near capacity access point, the handoff is deferred until the map 42 shows it is moving beyond a signal strength of its current access point or another mobile device moves out of the over-crowded access point's region. As a second example, the arbitration means 70 projects how long the mobile unit will be in the new access point region from the trajectory of its projected velocity and the map. If the projected trajectory will only pass briefly through the new zone without loosing satisfactory signal strength from its current access point or the next yet projected access point, the handoff from the current access point to the next access point and from the next access point to the next yet access point can be skipped in favor of a handoff directly from the current access point to the third next yet access point.

With continuing reference to FIG. 2 and further reference to FIG. 3, to improve the accuracy and reliability of position tracking, more than three scanning frequencies of the neighboring access points are selected for scanning to track the position of the mobile device $12_1, 12_2, \ldots, 12_n$. The number of the adjacent access points (scanned frequencies) varies as a function of the certainty of the position accuracy to minimize the number of channels to be scanned to determine the accurate position of the mobile unit $12_1$ as it moves within the defined area 16. As position becomes less certain, more nearby access points are scanned; as the position becomes more certain, fewer access points are scanned.

More specifically, as the position calculating means 56 determines the position of the mobile device $12_1$, a certainty determining means 72 determines a certainty of accuracy of the determined location based on prespecified factors such as longer intervals between samplings, motion at high rate of speed, motion along an erratic trajectory, or the like. The determined certainty is compared with a threshold which is preferably predetermined in advance based on certain criteria. Of course, it is also contemplated that the threshold can be varied to restrict or increase the number of scanned frequencies based on the system requirements. If the determined certainty is below the threshold, the scanning frequencies identifying means 62 accesses the area map database 42 and selects all operational frequencies existing within the area 16 for scanning. The scanned frequencies are presented in an order of the gradients, e.g. from the highest gradient to the lowest, and are stored in the scanned frequencies memory 54. The position calculating means 56 recalculates the position of the mobile device $12_1$, and the certainty determining means 72 determines the certainty of the recalculated position. The redetermined certainty is compared with the threshold. If the determined certainty is still below the threshold, the position calculating means 56 requests more frequencies from the scanned frequencies memory 54. The certainty determining means 72 recalculates the certainty each time an additional frequency is added to the position calculation and compares the determined certainty with the threshold until the threshold is reached and/or exceeded. The identified optimal adjacent access points and corresponding frequencies are stored in the scanning frequencies memory 64 to be scanned by the scanning means 52 to determine the speed and position of the mobile device $12_1$ with more accuracy.

The invention has been described with reference to the preferred embodiments. Modifications and alterations will occur to others upon reading and understanding of the preceding detailed description. It is intended that the invention be construed as including all such modifications and alterations insofar as they come within the scope of the appended claims or the equivalents thereof.

The invention claimed is:

1. A communications system comprising:
    a plurality of mobile wireless units movably located within a defined space of a wireless local area network;
    a plurality of fixed access points disposed at known locations in the defined space, each access point operating at a dedicated frequency different from the dedicated frequency of its nearest neighbor access points;
    a means for tracking movement of at least one mobile unit within the defined space including:
        a memory storing a map of the access points and relative signal strengths of signals from the access points at predefined locations in the defined space,
        a means for scanning identified scanning frequencies of access points nearby a selected one of the mobile wireless units to measure actual signal strengths between the selected mobile unit and each of the nearby access points, and
        a means for calculating a location of the selected mobile unit relative to the map by comparing the actual signal strengths with the map of relative signal strengths at predefined locations in the defined space;
    a means for assigning the nearby access points with strongest signals at the calibrated location to the selected mobile unit based on the map of relative strengths in the defined space and communicating the dedicated frequencies of the nearby access points to the selected mobile unit;
    wherein the tracking means tracks the movement of the selected mobile unit by periodically scanning the frequencies of the assigned access points adjacent the calculated location and predicts future locations of the selected mobile unit;
    wherein the assigning means assigns the nearby access points based on the predicted location of the selected mobile unit and the map;
    wherein the scanning means only scans the frequencies of the assigned nearby access points.

2. The system as set forth in claim 1, wherein the position tracking means includes:
    a velocity estimating means for determining speed and direction of movement of the selected mobile unit.

3. The system as set forth in claim 1, further including:
    a means for determining a degree of certainty of an accuracy of the calculated location.

4. The system as set forth in claim 3, wherein the number of nearby access points assigned to the selected mobile unit is a function of location accuracy certainty and the tracking means tracks the movement of the at least one mobile unit by periodically scanning only the frequencies of the access points assigned to the selected mobile unit.

5. The system as set forth in claim 1, further including a means for creating the map including:
 a means for measuring a plurality of initial signal strengths at predefined locations within the defined space;
 a means for mapping the initial signal strengths in relation to predefined locations in the defined space;
 a means for identifying locations and scanning frequencies of the access points in the defined space; and
 a means for creating the map and loading in the memory.

6. In a wireless local area network, a method comprising:
 tracking movement of a selected mobile device within a defined space using wireless access points, each access point having a dedicated frequency different from the dedicated frequency of nearby access points, the tracking including:
 (a) measuring actual signal strengths at the dedicated frequencies of only a designated subset of the access points neighboring a calculated location of the selected mobile device,
 (b) calculating an updated location of the mobile device by comparing the measured actual signal strengths with a predefined map of relative signal strengths at predefined locations in the defined space,
 (c) based on the predefined map and the calculated updated location, identifying from the predefined map an updated designated subset of the access points neighboring the updated calculated location with the strongest signals at the updated calculated location, and
 (d) periodically repeating steps (a)-(c) such that the mobile unit only scans the dedicated frequencies of the updated designated subset to determine its location;
 performing wireless communication with the selected mobile device using a communication access point selected from the access points of the updated designated subset; and
 handing off the selected mobile device from one communication access point to another communication access point based on the predefined map and the updated calculated location.

7. The method as set forth in claim 6, wherein the measuring comprises:
 wherein said updated designated subset of the access points consists of three of the access points nearest the updated calculated location.

8. The method as set forth in claim 6, further including:
 estimating a speed and a direction of movement of the selected mobile device based on the tracking including at least the updated calculated location and one or more prior calculated locations; and
 predicting a future location of the selected mobile device from the estimated speed and direction;
 wherein the updated designated subset is based on the predicted future location and the map.

9. The method as set forth in claim 6, further including, before tracking movement, generating the map by:
 measuring a plurality of initial signal strengths at a plurality of measurement locations within a defined space;
 mapping the initial signal strengths in relation to the plurality of measurement locations in the defined space;
 identifying a plurality of locations and scanning frequencies of the access points located in the defined space; and
 combining the signal strengths at the plurality of measurement locations and the access point locations and the frequency assigned to each access point into the map.

10. The method as set forth in claim 9, further including:
 determining a certainty of an accuracy of the updated calculated location of the mobile device.

11. The method as set forth in claim 10, wherein a size of the updated designated subset of the access points is a variable based on the determined certainty of the location calculation accuracy.

12. A communications system comprising:
 a plurality of access points disposed at known locations in a defined space, each access point operating at a dedicated one of a plurlaity of frequencies;
 a mobile wireless unit movably located within the defined speace, the mobile wireless unit including a memory which stores frequencies of a designated subset of the plurality of frequencies;
 a computer processor which tracks movement of the mobile wireless unit and reassigning the stored frequencies of the designated subset, the computer processor being programmed to perform the steps of:
 measuring actual signal strengths at the frequencies of only the stored designated subset of the plurality of frequencies,
 calculating a location of the mobile wireless unit by comparing the actual signal strengths with a predefined map of relative signal strengths at predefined locations in the defined space;
 repeating the measuring and calculating step to update the calculated location periodically;
 updating the stored designated subset of the plurality of frequencies based on the updated calculated location and the map;
 providing wireless communication service to the mobile wireless unit via a selected communication access point; and
 handing off the mobile wireless unit from one selected communication access point to another selected communication access point based on the calculated location and the map.

13. The communication system as set forth in claim 12, further including:
 a memory in which the map is stored and wherein the map depicts a location of each access point in defined space and relative signal strengths of signals from each of the access points at a multiplicity locations in the defined space.

14. The communication system as set forth in claim 12, wherein the map is a predefined map generated by:
 measuring a plurality of initial signal strengths at a plurality of measurement locations within a defined space;
 mapping the initial signal strengths in relation to the plurality of measurement locations in the defined space;
 identifying a plurality of locations and scanning frequencies of the access points located in the defined space; and
 combining the signal strengths at the plurality of measurement locations and the access point locations and the frequency assigned to each access point into the map.

15. The communication system as set forth in claim 12, wherein updating the stored designated subset of the plurality of frequencies includes:
 from the calculated location and one or more previous locations, projecting a future location of the mobile device; and
 updating the stored designated subset with the frequencies of the access points nearest to the projected future location.

16. The communication system as set forth in claim 12, wherein the computer processor is further programmed to:
  determine a certainty of the accuracy of the calculated location;
  adjusting a number of frequencies in the designated subset in accordance with the determined certainty of accuracy.

* * * * *